(12) United States Patent  
Waseem et al.

(10) Patent No.: US 8,797,016 B2  
(45) Date of Patent: Aug. 5, 2014

(54) APPARATUS AND METHOD FOR POWER EXTRACTION FROM HIGH IMPEDANCE SOURCES

(76) Inventors: Saher Waseem, Hilliard, OH (US); Sana Waseem, Hilliard, OH (US); Waseem Ahmed Roshen, Hilliard, OH (US)

( * ) Notice: Subject to any disclaimer, the term of this patent is extended or adjusted under 35 U.S.C. 154(b) by 116 days.

(21) Appl. No.: 13/292,983

(22) Filed: Nov. 9, 2011

(65) Prior Publication Data

US 2013/0114304 A1    May 9, 2013

(51) Int. Cl.
  *G05F 5/00*    (2006.01)
  *H02M 3/335*    (2006.01)
  *H02J 7/34*    (2006.01)

(52) U.S. Cl.
  CPC ........... *H02M 3/33538* (2013.01); *H02J 7/345* (2013.01)
  USPC ............................................. 323/299; 363/20

(58) Field of Classification Search
  USPC ............. 363/15, 16, 18, 19, 20, 21.01, 21.02, 363/21.04, 21.07, 21.08, 21.12, 21.15, 363/21.16, 95, 97; 323/95, 97, 906, 299
  See application file for complete search history.

(56) References Cited

U.S. PATENT DOCUMENTS

| | | | |
|---|---|---|---|
| 5,001,415 A * | 3/1991 | Watkinson | 323/304 |
| 5,712,774 A * | 1/1998 | Uramoto | 323/300 |
| 6,385,061 B1 * | 5/2002 | Turchi et al. | 363/21.12 |
| 7,443,125 B2 * | 10/2008 | Clothier et al. | 363/34 |
| 2004/0004402 A1 * | 1/2004 | Kippley | 307/82 |
| 2009/0168467 A1 * | 7/2009 | Schmidt et al. | 363/34 |
| 2010/0002470 A1 * | 1/2010 | Kiamilev et al. | 363/16 |
| 2010/0220503 A1 * | 9/2010 | Djenguerian et al. | 363/21.12 |

* cited by examiner

*Primary Examiner* — Gary L Laxton  
*Assistant Examiner* — Alex Torres-Rivera (57) ABSTRACT

A system and method for extracting power from a power source having a high internal resistance are presented. A capacitor is connected to the power source. A switch is configured to selectively connect and disconnect the capacitor from a load. A processor is configured to monitor an energy flow from the power source into the capacitor and an amount of energy in the capacitor. When the energy flow from the power source into the capacitor falls below a first threshold, the processor is configured to close the switch to dissipate energy from the capacitor to the load. When the energy in the capacitor falls below a second threshold, the processor is configured to open the switch to disconnect the capacitor from the load.

14 Claims, 5 Drawing Sheets

APPARATUS AND METHOD FOR POWER EXTRACTION FROM HIGH IMPEDANCE SOURCES

FIELD OF THE INVENTION

This invention relates to an apparatus and method to extract power from a power source. In certain embodiments, the invention is directed to an apparatus and method for extracting power from a power source having a relatively high internal impedance.

BACKGROUND OF THE INVENTION

Many electrical power sources exist which have high internal resistances. The internal resistance of a power source measures the resistance within that power source to the flow of current through the power source. Internal resistance can be dependent upon many factors, including the construction of the power source, ambient temperature conditions, or changes in the internal chemistry of the power source. Although internal resistance is often associated with a power source comprising batteries, other types of power sources can have relatively high internal resistance. Examples of such power sources include solar cells and fuel cells.

When a power source has a relatively high internal resistance, it is difficult to extract electrical energy from the source in an efficient manner because the power source's internal resistance dissipates a relatively large portion of the electrical energy. That dissipated energy is therefore consumed within the power source and is never delivered to the load. Additionally, it is difficult to use a power source with high internal resistance to provide a desired voltage to a given electrical load, such as a particular electrical or electronic circuit, because the voltage supplied by the power source drops substantially as the load draws current from the power source. If a number of high internal resistance power sources are connected in series (for example, to generate a high output voltage), there are additional losses in terms of extracted power because the current flowing through each power source must pass through the internal resistances of the other power sources that connect to it.

SUMMARY OF THE INVENTION

In one implementation, the present invention is a system for extracting power from a power source having a high internal resistance. The system includes a capacitor connected to the power source, a switch configured to selectively connect and disconnect the capacitor from a load, and a processor. The processor is configured to monitor an energy flow from the power source into the capacitor and an amount of energy in the capacitor, and, when the energy flow from the power source into the capacitor falls below a first threshold, close the switch to dissipate energy from the capacitor to the load. The processor is configured to, when the energy in the capacitor falls below a second threshold, open the switch to disconnect the capacitor from the load.

In another implementation, the present invention is a system for extracting power from a power source having a high internal resistance. The system includes a capacitor connected to the power source, and a processor. The processor is configured to monitor an energy flow from the power source into the capacitor and an amount of energy in the capacitor. The processor is configured to, when the energy flow from the power source into the capacitor falls below a first threshold, dissipate energy from the capacitor to the load, and, when the energy in the capacitor falls below a second threshold, disconnect the capacitor from the load.

In another implementation, the present invention is a method of extracting power from a power source having a high internal resistance. The method includes monitoring an energy flow from the power source into a capacitor connected to the power source, and, when the energy flow from the power source into the capacitor falls below a first threshold, dissipating energy from the capacitor to a load connected to the capacitor. The method includes monitoring an amount of energy in the capacitor, and, when the energy in the capacitor falls below a second threshold, disconnecting the capacitor from the load.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Some of the functional units described in this specification have been labeled as modules in order to more particularly emphasize their implementation independence. For example, a module may be implemented in field programmable gate arrays, programmable array logic, programmable logic devices, or the like. Modules may also be implemented in software for execution by various types of processors.

Figure 3:
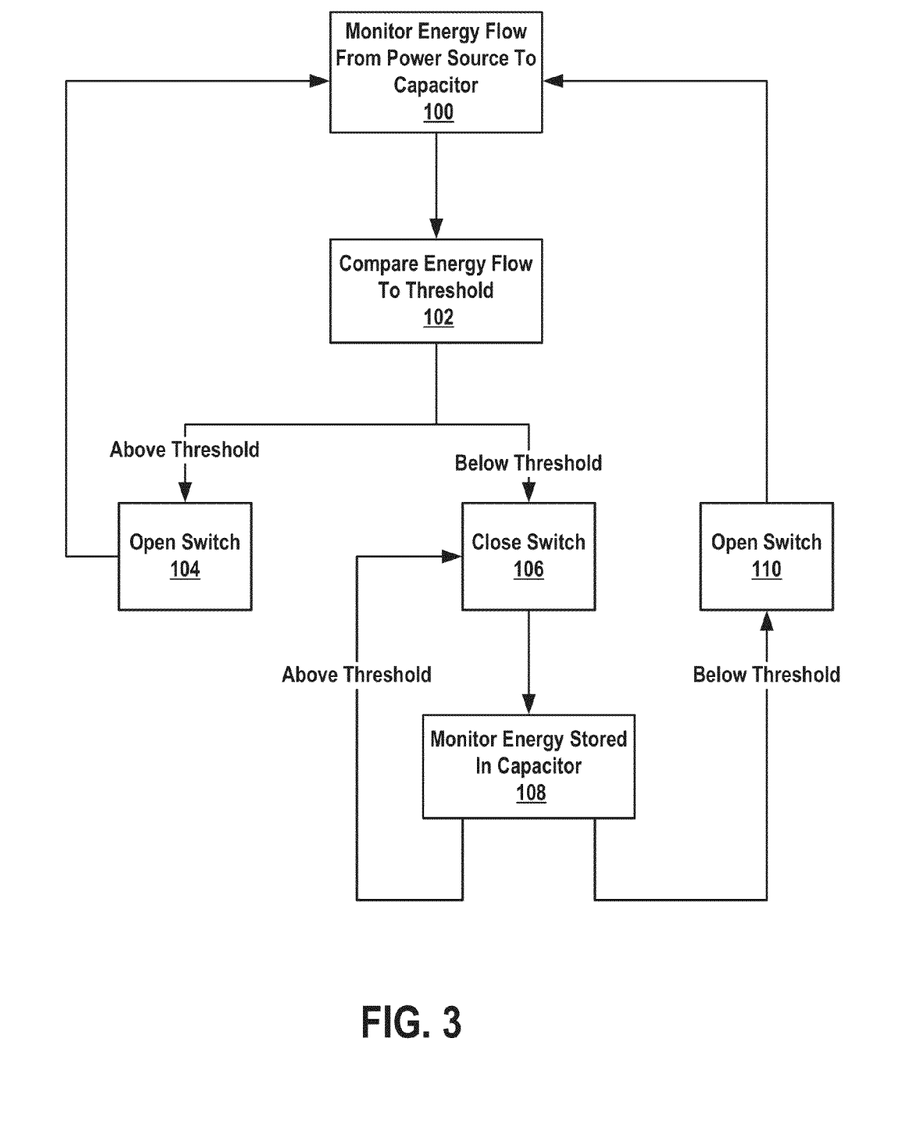
FIG. 3 is a flowchart illustrating an example method for extracting power from a power source.

The schematic flow chart diagrams included are generally set forth as logical flow-chart diagrams (e.g., FIG. 3). As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The invention will be described as embodied in an apparatus and method for extracting power from a power source. In certain embodiments, the invention is directed to an apparatus and method for extracting power from a power source having a relatively high internal impedance. In one implementation, an enhancement factor of approximately 2 to 3.5 can be achieved using the present apparatus and method.

In one implementation, the present system includes a capacitor connected across the terminals of a high impedance power source. The capacitor is configured to operate as both a power extractor and a resonant component to transfer extracted power from the power source to an inductor. The circuit is operated in a high frequency mode and power is transferred from the power source to the inductor in an efficient manner. In one implementation, the inductor is part of a coupled inductor system or a transformer for delivering energy to a load.

In another implementation of the present system, the invention is used to reduce the internal power dissipation in solar cells (or other high internal resistance power sources) that are connected in series by providing an independent path for the current to flow from each power source to the extracting circuit. This implementation also facilitates obtaining a desired voltage from the series-connected power sources.

Figure 1:
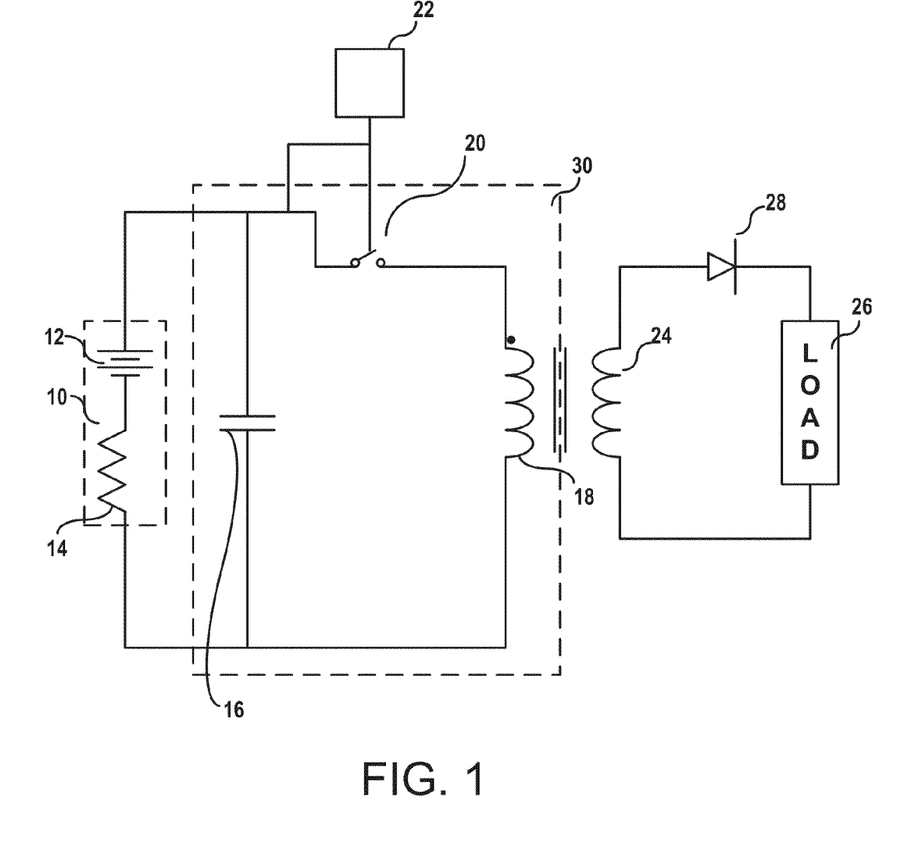
FIG. 1 is an illustration of an electrical circuit including a power source having a relatively high internal resistance and a load, where the circuit incorporates a power extraction circuit configured in accordance with the present disclosure.

FIG. 1 is an illustration of an electrical circuit including a power source having a relatively high internal resistance and a load, the circuit incorporates a power extraction circuit 30 connected between the power source and the load, where the power extraction circuit is configured in accordance with the present disclosure. As shown in FIG. 1, the circuit includes power source 10. Power source 10 includes a voltage source 12 and an internal resistance 14. Power source 10 may include a power source having a relatively high internal resistance 14, such as a solar cell or a fuel cell. A typical solar cell can comprise a power source having an open circuit voltage of 0.6 volts and an internal resistance of approximately 3 ohms. In such a supply, the short circuit current is typically 0.2 amperes.

Capacitor 16 is connected across the terminals of power source 10. Capacitor 16 may be selected to have a low equivalent series resistance (ESR). Inductor 18 is also connected across the terminals of power source 10. Switch 20 is connected between a first terminal of inductor 18 and a first terminal of power source 10. Switch 20 is configured to optionally connect or disconnect the first terminal of inductor 18 to or from the first terminal of power source 10. The open or closed status of switch 20 is controlled by processor 22 that is connected to switch 20. Processor 22 is also configured to monitor energy flow into capacitor 16 from power source 10 and out of capacitor 16 into inductor 18. In one implementation, switch 20 includes a switch having low high-frequency switching losses, capacitance, and low turn-on resistances. Example switches include metal oxide semiconducting field effect transistors (MOSFETs), bi-polar Junction transistors (BJTs), and silicon-controlled rectifiers (SCRs).

In one implementation, energy flow into and out of the capacitor is determined by analyzing the voltage capacitor using, for example, a voltage sensor connected across the capacitor. Energy flow into and out of the capacitor is related to the voltage across the capacitor. This energy flow can be determined by measuring a voltage across the capacitor and then using that voltage measurement to identify an energy transfer rate using, for example the transfer rate curve of FIG. 2.

Inductor 18 is coupled to inductor 24 so that a change in current flow through one inductor induces a voltage across the second inductor. This allows electrical energy to be transferred from inductor 18 to inductor 24. In one implementation, inductors 18 and 24 include inductors having relatively low high-frequency losses and are each wound around the same core to facilitate magnetic coupling. Alternatively, inductors 18 and 24 may each be replaced by the primary and secondary windings of a transformer. Inductor 24 is connected across load 26 in order to deliver electrical energy thereto. Diode 28 (e.g., a diode having a low forward voltage drop) is disposed between a first terminal of inductor 24 and load 26 to limit current flow between inductor 24 and load 26 to a single direction. In one implementation, an output capacitor (not shown) may be coupled across load 26, wherein the output capacitor is selected to meet the required output ripple voltage requirement.

The combination of capacitor 16, switch 20, and inductor 18 form power extraction circuit 30 of the present invention.

During operation of the circuit shown in FIG. 1, capacitor 16 initially draws current from power source 10 (for example, when power source 10 is first connected to capacitor 16). As the voltage of capacitor 16 increases, an amount of current (and, thereby, energy) flowing from power source 10 to capacitor 16 begins to decrease (see, for example, FIG. 2, described below). Because the current flow to capacitor 16 is varied (and, consequently, the voltage of capacitor 16 is varied), the rate at which energy is transferred from power source 10 to capacitor 16 is not constant. Instead, the rate of energy transfer varies with time. This variation in energy transfer is illustrated in FIG. 2.

Figure 2:
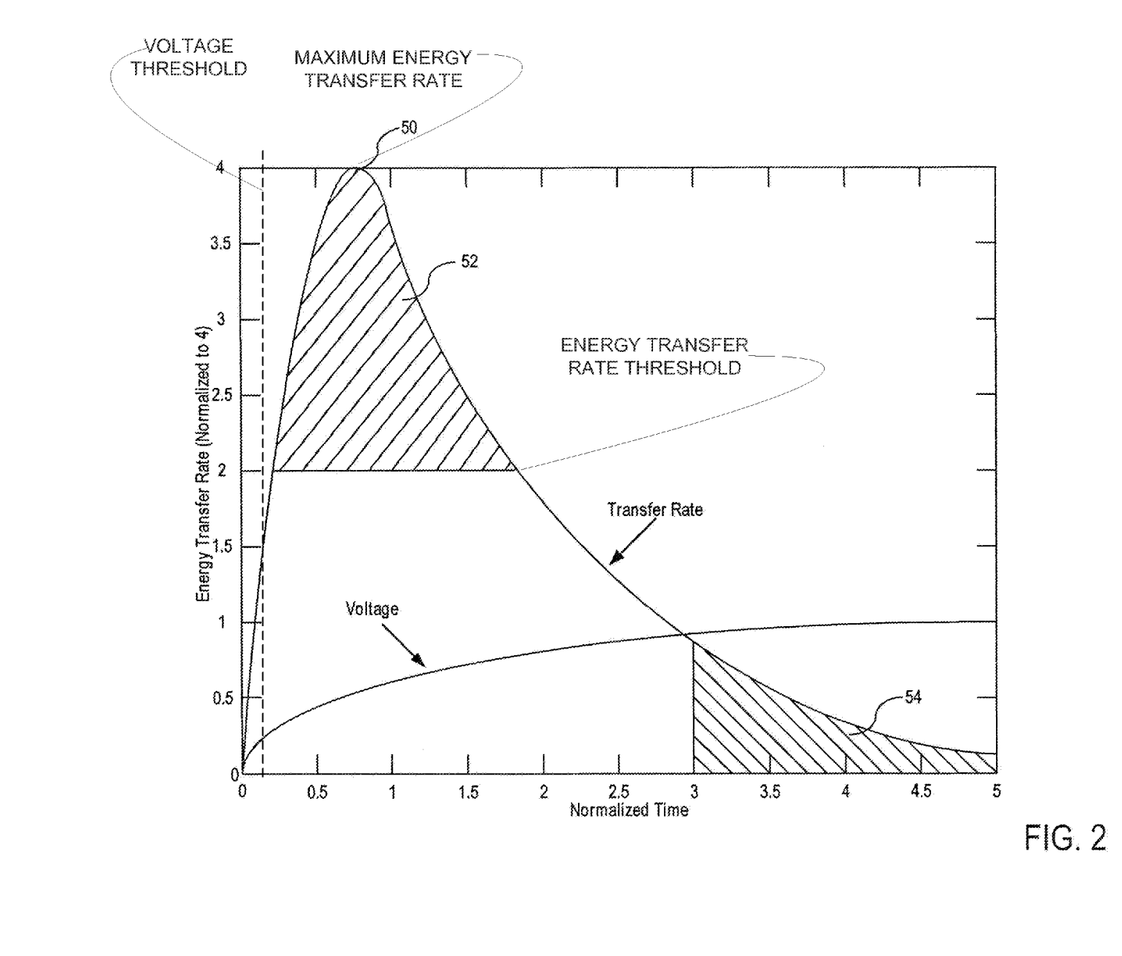
FIG. 2 is a graph showing an energy transfer rate from a power source to a capacitor as well as the corresponding voltage across the capacitor versus time.

FIG. 2 is a graph showing energy transfer rate from power source 10 to capacitor 16 as well as the corresponding voltage across capacitor 16 versus time. As seen in FIG. 2, initially, the energy transfer to the capacitor is relatively high (see, for example, point 50 of the transfer curve). As such, there is a period of time after power source 10 initially begins transferring energy to capacitor 16 in which energy is transferred most efficiently. This period of time is illustrated by shaded region 52 of FIG. 2.

As time passes, however, the energy transfer to capacitor 16 become less and less efficient. Referring to FIG. 2, for example, after the initial period of efficient energy transfer, the energy transfer efficiency diminishes relatively rapidly. As the voltage of capacitor 16 approaches that of power source 10 minus the voltage drop across power source 10's internal resistance, energy transfer is very inefficient. This period of inefficient transfer is illustrated by shaded area 54 on FIG. 2.

To ensure that energy is being transferred efficiently to capacitor 16 (and, therefore, out of power source 10), the present system is configured to ensure that capacitor 16 and power source 10 are operating so that the energy transfer characteristics fall within shaded area 52 of FIG. 2. To accomplish this, switch 20 is periodically closed to move energy out of capacitor 16 into inductor 18 and, from there, into load 26. By periodically discharging capacitor 16 into inductor 18, the voltage across capacitor 16 can be maintained below a threshold value allowing for energy to be efficiently transferred out of power source 10, even when power source 10 has a high internal resistance.

To provide for efficient transfer of energy out of power source 10 (and into capacitor 16), processor 22 is configured to implement the method illustrated in FIG. 3. In step 100, processor 22 monitors energy delivery from power source 10 to capacitor 16. In step 102, processor 22 compares the measured energy flow to a predetermined threshold in step 102. When the energy flow into capacitor 16 from power source 10 falls above the predetermined threshold (e.g., within shaded region 52 (shown in FIG. 2)), processor 22 causes switch 20 to be open allowing energy to continue to flow from power source 10 to capacitor 16 in step 104.

In a typical installation (e.g., using a solar cell), optimal energy transfer occurs when the capacitor voltage is between 20% and 75% of the open circuit voltage of the solar cell (or other high internal resistance power source). In other words, for a typical solar cell with an open circuit voltage of 0.6 volts and an internal resistance of 3 ohms, the capacitor voltage for which the switch will remain open is between 0.12 volts and 0.45 volts. For all other values of capacitor voltage the switch will be closed. This condition allows for efficient energy transfer from power source 10 directly to capacitor 16.

As capacitor 16 charges, however, the energy transfer from power source 10 becomes less efficient (see, for example, FIG. 2). If processor 22 detects that the energy transfer rate from power source 10 to capacitor 16 falls below the threshold (e.g., outside of shaded region 52 shown in FIG. 2), processor 22 causes switch 20 to close in step 106. The various thresholds at which switch 20 opens and closes will be adjusted based upon the characteristics of power source 10. With switch 20 closed, capacitor 16 is connected to inductor 18. Capacitor 16 will then resonate with inductor 18 causing energy to be transferred from capacitor 16 to inductor 18, where it is eventually transferred through inductor 24 into load 26.

After closing switch 20, processor 22 monitors the amount of energy remaining within capacitor 16 in step 108 and compares that amount of energy to a threshold value. As the voltage across capacitor 16 is directly related to the energy stored therein, the remaining energy of capacitor 16 may be determined by detecting and monitoring a voltage across capacitor 16. Until sufficient energy has been transferred out of capacitor 16, processor 22 holds switch 20 in a closed condition. After sufficient energy has been dissipated from capacitor 16 through switch 20 and into inductor 18 so that power source 10 may again efficiently transfer energy into capacitor 16, processor 22 opens switch 20 in step 110. The method is shown in FIG. 3 then repeats with processor 22 continually monitoring energy transfer from power source 10 to capacitor 16.

With switch 20 open, capacitor 16 begins the next cycle of energy transfer from power source 10 to the capacitor 16 and, eventually, to inductor 18. In one implementation, the period of time in which switch 20 is closed is typically smaller than the period of time that switch 20 is open. This results because the circuit is operating in a mode in which most of the time maximum power is transferred to capacitor 16.

In one specific implementation of the electrical circuit illustrated in FIG. 1, power source 10 includes a solar cell having an open circuit voltage of 0.6 volts, an internal resistance of 3 ohms, and a short-circuit current of 0.2 amperes. In conjunction with such a power source, capacitor 16 may be selected to have a capacitor of approximately 5 micro-Farads. The frequency of sampling the capacitor will depend on the time constant of the circuit, which is given by the product of capacitance value and the internal resistance of the solar cell or panel. In one implementation, the time period between samples is approximately 50-100 times shorter than that time constant.

The present system differs greatly from conventional power supply circuits that incorporate input capacitors. In those circuits, the input capacitor is selected to be such that the capacitance value as large as possible in order to provide a constant voltage to the remaining circuit. In other words, the input capacitor operates as a buffer to compensate for temporary disruptions in power consumption of the connected load. In contrast, in the present system, a relatively small capacitor with relatively small capacitance value is used because the capacitor does not operate as an input capacitor and is instead used to only extract energy from the high internal resistance power source. Additionally, the capacitor should be capable of resonating with the inductor to quickly transfer accumulated energy to the circuit's load. If a large, conventional input capacitor were to be used in conjunction with the present system, the rate of transfer of energy to the capacitor (e.g., capacitor 16 of FIG. 1) would be diminished, as indicated by shaded area 54 of FIG. 2.

In some implementations of the present system, a number of power sources, each having relatively high internal resistances, are connected together in series to serve a particular load. In conventional systems, this would ordinarily result in poor performance as any current flowing from one power source must pass through the high internal resistance of the other power sources that are each connected together. The present system, in contrast, allows for current drawn from each power source to flow to an inductor supplying the load without also flowing through the internal resistances of the other power sources.

Figure 4:
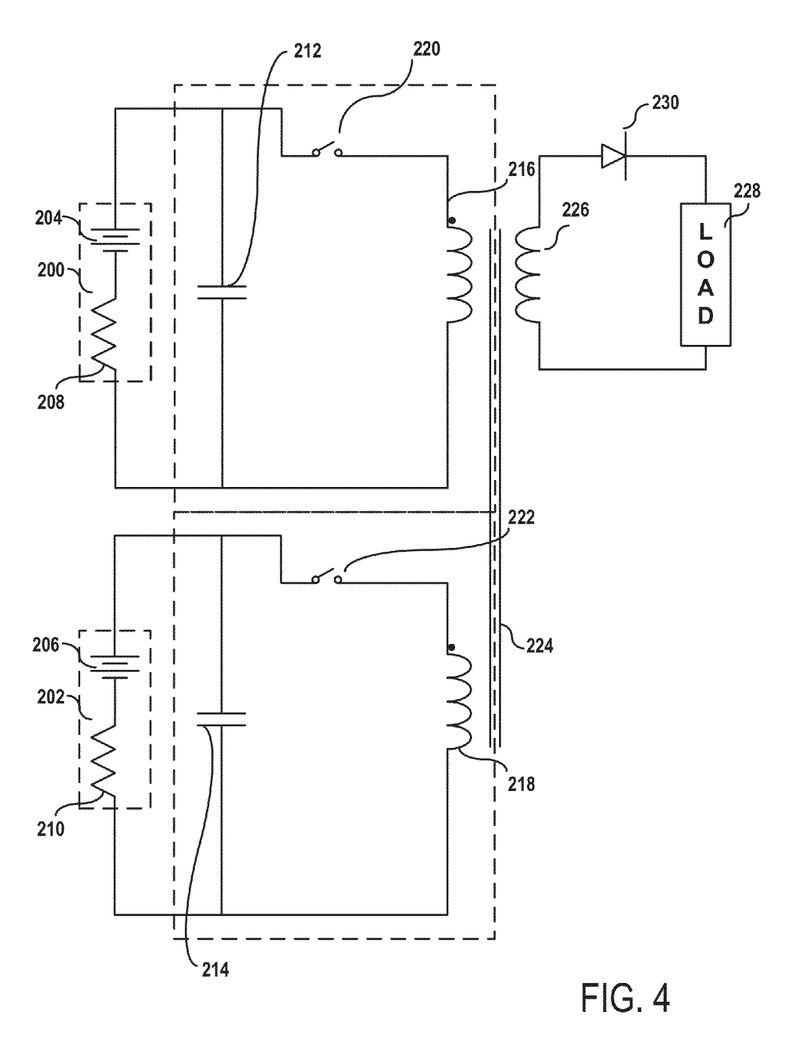
FIG. 4 is an illustration of an electrical circuit including two power sources connected in series and connected to power extraction circuitry.
Figure 5A:
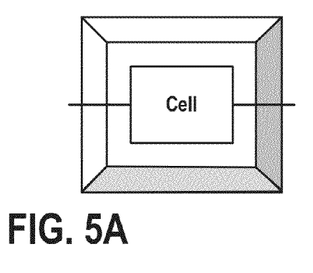
FIGS. 5A-5D illustrate a number of potential interconnections between solar cells within a device.
Figure 5B:
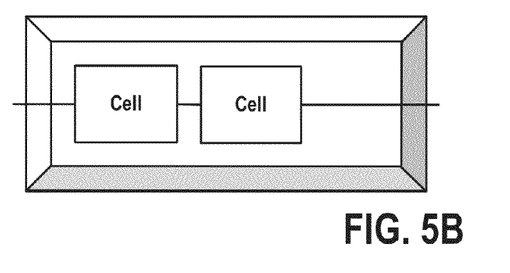
Figure 5C:
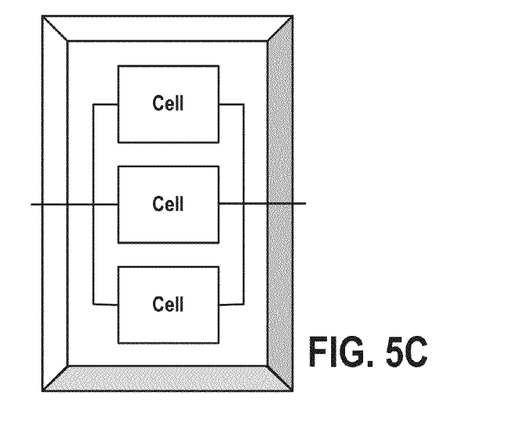
Figure 5D:
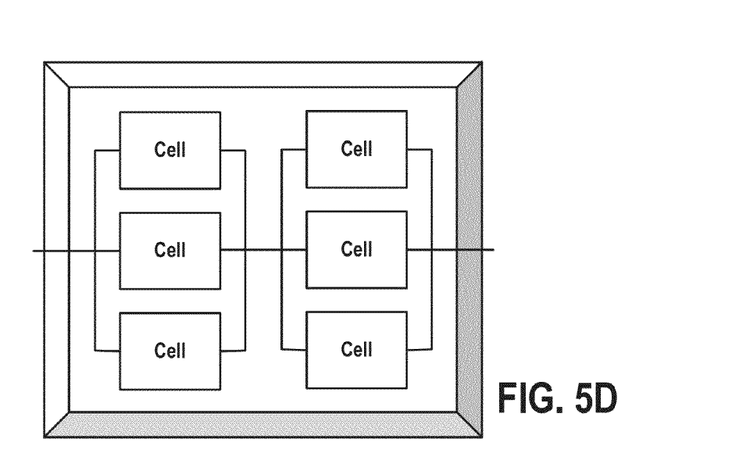

FIG. 4 is an illustration of an electrical circuit including two power sources, each having a relatively high internal resistance, connected in series to a load, wherein the circuit incorporates power extraction circuitry connected to each power source. As shown in FIG. 4, the circuit comprises two power sources 200 and 202. Each power source includes a voltage supply 204 and 206 and a relatively high internal resistance 208 and 210. Capacitor 212 is connected across the terminals of power source 200. Capacitor 214 is connected across the terminals of power source 202. Inductor 216 is connected across the terminals of power source 200 via switch 220. Inductor 218 is connected across the terminals of power source 200 via switch 222. Switch 220 is connected between a first terminal of inductor 216 and a first terminal of power source 200. Switch 222 is connected between a first terminal of inductor 218 and a first terminal of power source 202. Each of switches 220 and 222 are configured to optionally connect or disconnect the first terminal of inductors 216 and 218 to their respective power sources. The open or closed status of switches 220 and 222 are controlled by one or more connected processors (not shown).

In one implementation of the circuit shown in FIG. 3, the capacitances of capacitors 212 and 214 are approximately equal, while the inductances of inductors 216 and 218 are also approximately equal. In that case, with the components connected to each power source being matched, both switches 220 and 222 may be operated synchronously, with each of the switches being opened and closed at the same in accordance with the method illustrated in FIG. 3.

Each of inductors 216 and 218 are wound about core 224 and are, thereby, coupled to inductor 226. Because each of inductors 216 and 218 are wound about the same core, their flux is additive, causing inductor 226 to see a summed voltage for each inductor.

Through core 224, inductors 216 and 218 transfer energy to inductor 226 which is, in turn, connected across load 228. Diode 230 is disposed between a first terminal of inductor 226 and load 228 to limit current flow between inductor 226 and load 228 to a single direction. In one implementation, an output capacitor may be coupled across load 228, wherein the output capacitor is selected to meet the required output ripple voltage requirement.

Although the circuit of FIG. 4 shows only two series-connected power sources, more power sources may be connected in series.

FIG. 4, therefore, shows two separate power sources 200 and 202, each independently configured in accordance with the single power source of FIG. 1. Accordingly, each power source is connected to a power extraction circuit to improve the efficiency of energy transfer from each power source to the target load. Each power extraction circuit in FIG. 4 includes a switch (e.g., switches 220 and 222) that can be periodically opened and closed to transmit energy from the power source to the attached capacitor (e.g., one of capacitors 212 and 214) in accordance with the method shown in FIG. 3.

In one implementation, the present system may be used to facilitate the retrieval of energy from one or more solar cells. Solar cells can be connected in series or in parallel or a combination of series and parallel connections. In any configuration, the power extraction circuit of the present system can be coupled to each solar cell to facilitate energy extraction therefrom. FIGS. 5A-5D illustrate a number of potential interconnections between solar cells within a device. In other implementations, though, the present system may be used to facilitate energy retrieval from any power source having a high internal resistance such as a solar cell or fuel cell.

While the preferred embodiments of the present invention have been illustrated in detail, it should be apparent that modifications and adaptations to those embodiments may occur to one skilled in the art without departing from the scope of the present invention as set forth in the following claims.

We claim:

1. A system for extracting power from a power source having a high internal resistance, comprising:
   a small capacitor with small capacitance value connected to the power source;
   wherein the capacitance value of the small capacitor is such that a voltage across the small capacitor is between 20% and 75% of the open circuit voltage of the source;
   a switch configured to selectively connect and disconnect the small capacitor from a load;
   a processor configured to:
   monitor an energy transfer rate from the power source into the small capacitor and the voltage across the small capacitor,
   when the energy transfer rate from the power source into the small capacitor reaches a maximum value and then decreases to fall below an energy transfer rate threshold, close the switch to dissipate energy from the small capacitor to the load, and
   when the voltage across the small capacitor falls to a voltage threshold, open the switch to disconnect the small capacitor from the load;
   wherein when said switch is open, no energy is transferred to the load.

2. The system of claim 1, including:
   a first inductor connected to the small capacitor through the switch; and
   a second inductor connected to the load, where the first and second inductors are magnetically coupled to one another.

3. The system of claim 2, wherein the first inductor and second inductor are wound about a mutual core.

4. The system of claim 3, including:
   a third inductor wound about the mutual core, the third inductor being connected to a second small capacitor through a second switch;
   wherein:
   the second small capacitor is connected to a second power source;
   the third inductor is magnetically coupled to the second inductor;
   and the third inductor is not magnetically coupled to the first inductor.

5. The system of claim 1, including a transformer, wherein the small capacitor is connected to a primary winding of the transformer and the load is connected to a secondary winding of the transformer.

6. The system of claim 1, wherein the power source comprises a solar cell.

7. The system of claim 1, wherein the power source comprises a fuel cell.

8. A system for extracting power from a power source having a high internal resistance, comprising:
   a small capacitor with a small capacitance value connected to the power source;
   wherein the capacitance value of the small capacitor is such that a voltage across the small capacitor is between 20% and 75% of the open circuit voltage of the source;
   a processor configured to:
   monitor an energy transfer rate from the power source into the small capacitor and the voltage across the small capacitor,
   when the energy transfer rate from the power source into the small capacitor reaches a maximum value and then decreases to an energy transfer rate threshold, dissipate energy from the small capacitor to the load, and
   when the voltage across the small capacitor falls to a voltage threshold, disconnect the small capacitor from the load;
   wherein when said small capacitor is disconnected from the load, no energy is transferred to the load.

9. The system of claim 8, including:
   a first inductor connected to the small capacitor; and
   a second inductor connected to the load, where the first and second inductors are magnetically coupled to one another.

10. The system of claim 9, wherein the first inductor and second inductor are wound about a mutual core.

11. The system of claim 8, including:
    a transformer, wherein the small capacitor is connected to a first inductor comprising a primary winding of the transformer and the load is connected to a secondary winding of the transformer;

a second inductor connected to the load, where the first inductor and second inductor are wound around a common core.

12. The system of claim 8, wherein the power source comprises a solar cell.

13. A method of extracting power from a power source having a high internal resistance, comprising:
- monitoring an energy transfer rate from the power source into a small capacitor with a small capacitance value connected to the power source;
- wherein the capacitance of the small capacitor is such that the capacitor voltage is between 20% and 75% of the oven circuit voltage of the source;
- when the energy transfer rate from the power source into the small capacitor reaches a maximum value and then decreases to an energy transfer rate threshold, dissipating energy from the small capacitor to a load connected to the small capacitor; and
- monitoring a voltage across the small capacitor,
- when the voltage across the small capacitor falls to a voltage threshold, disconnecting the small capacitor from the load;
- wherein when said small capacitor is disconnected from the load, no energy is transferred to the load.

14. The method of claim 13, wherein the power source comprises a solar cell.

\* \* \* \* \*